United States Patent
Goff et al.

(10) Patent No.: US 7,975,184 B2
(45) Date of Patent: Jul. 5, 2011

(54) DIAGNOSTIC ACCESS SYSTEM

(76) Inventors: Donald Goff, Austin, TX (US); Robert Gretta, Austin, TX (US); Todd M. Brower, Austin, TX (US)

( * ) Notice: Subject to any disclaimer, the term of this patent is extended or adjusted under 35 U.S.C. 154(b) by 418 days.

(21) Appl. No.: 11/728,851

(22) Filed: Mar. 27, 2007

(65) Prior Publication Data

US 2007/0233858 A1 Oct. 4, 2007

(51) Int. Cl.
*G06F 11/00* (2006.01)
(52) U.S. Cl. ............................. 714/46; 714/47.1; 714/25
(58) Field of Classification Search ................ 714/1–57; 707/200; 709/200, 217; 370/401; 700/20; 342/357.1

See application file for complete search history.

(56) References Cited

U.S. PATENT DOCUMENTS

| | | | |
|---|---|---|---|
| 5,970,430 A | 10/1999 | Burns et al. | |
| 6,330,517 B1 | 12/2001 | Dobrowski et al. | |
| 6,377,859 B1 | 4/2002 | Brown et al. | |
| 6,557,118 B2 | 4/2003 | Schleiss et al. | |
| 6,629,059 B2 | 9/2003 | Borgeson et al. | |
| 6,804,796 B2 | 10/2004 | Gustavsson et al. | |
| 6,826,590 B1 * | 11/2004 | Glanzer et al. | 709/200 |
| 6,829,478 B1 | 12/2004 | Layton et al. | |
| 6,859,755 B2 | 2/2005 | Eryurek et al. | |
| 6,901,474 B2 | 5/2005 | Lym et al. | |
| 6,912,591 B2 * | 6/2005 | Lash | 709/246 |
| 6,912,671 B2 | 6/2005 | Christensen et al. | |
| 6,963,993 B1 | 11/2005 | Semancik | |
| 6,990,602 B1 | 1/2006 | Skinner et al. | |
| 6,993,693 B2 | 1/2006 | Fitchett et al. | |
| 7,165,097 B1 | 1/2007 | Mackin et al. | |
| 7,177,919 B1 | 2/2007 | Truong et al. | |
| 7,178,051 B2 | 2/2007 | Barr et al. | |
| 7,178,059 B2 | 2/2007 | Greenspan et al. | |
| 2002/0010562 A1 * | 1/2002 | Schleiss et al. | 702/183 |
| 2002/0010700 A1 * | 1/2002 | Wotring et al. | 707/100 |
| 2002/0041289 A1 | 4/2002 | Hatch et al. | |
| 2002/0183971 A1 | 12/2002 | Wegerich et al. | |
| 2002/0194547 A1 * | 12/2002 | Christensen et al. | 714/43 |
| 2004/0199353 A1 * | 10/2004 | Bingham et al. | 702/122 |
| 2004/0260408 A1 * | 12/2004 | Scott et al. | 700/20 |
| 2005/0165926 A1 | 7/2005 | Motoyama et al. | |
| 2005/0210313 A1 | 9/2005 | Staub et al. | |
| 2005/0216785 A1 | 9/2005 | Suzuki et al. | |
| 2005/0251702 A1 | 11/2005 | Baccelli et al. | |
| 2006/0010336 A1 | 1/2006 | Hopkins et al. | |
| 2006/0031482 A1 | 2/2006 | Mohan et al. | |
| 2006/0036893 A1 | 2/2006 | Anglin et al. | |
| 2006/0136194 A1 * | 6/2006 | Armstrong et al. | 704/4 |
| 2006/0164296 A1 * | 7/2006 | LaMothe et al. | 342/357.1 |
| 2006/0179340 A1 | 8/2006 | Gunnels et al. | |
| 2006/0259243 A1 * | 11/2006 | Bregulla et al. | 702/19 |
| 2006/0259809 A1 * | 11/2006 | Mishra et al. | 714/4 |
| 2007/0022315 A1 | 1/2007 | Comegys | |
| 2007/0038889 A1 * | 2/2007 | Wiggins et al. | 714/20 |

* cited by examiner

*Primary Examiner* — Scott T Baderman
*Assistant Examiner* — Sarai Butler
(74) *Attorney, Agent, or Firm* — Michael T. Perkins; PEI (57) ABSTRACT

A dedicated processing system for monitoring, processing and combining mass statistical diagnostic data of a process control system. Through real time and near real time network health monitoring by the system statistical inferences can be made to anticipate potential system and device problems with notification(s) to users. A variety of user alerts are facilitated, including status and warning LEDs, direct display, and display on a networked computer. Multiple systems can be employed and systems will discover each other and interoperate. Specific systems can be specified to gather and unify diagnostic data from installations with multiple systems.

24 Claims, 9 Drawing Sheets

Screen Title
193 — 195 —

Network Status for Port 1

| Column 1 197 | Column 2 199 | Column 3 201 |
|---|---|---|
| Address | Device Tag | Status |
| 15 | Temperature101 | Ok |
| 17 | Pressure101 | Warning |
| 18 | Flow101 | Ok |
| 24 | Valve101 | Error |

Fig 9

DIAGNOSTIC ACCESS SYSTEM

FEDERALLY SPONSORED RESEARCH

N/A

SEQUENCE LISTING OR PROGRAM

US Classification 714/4

BACKGROUND

1. Technical Field of Invention

This invention relates to a network controller and more particularly to such a processor at an access point with diagnostics for monitoring, analyzing, predicting, and reporting of network performance 2. Background of the Invention Process control systems are evolving from individual process control devices with specialized, proprietary, or no inter-device communications to communicating devices with standard protocols. These protocol standards for communication are varied and intended for different applications. The protocol standards for process control systems differ from Ethernet standards as different functions are needed in process control than with Ethernet functions. Existing process control system networks are a hodge-podge of home brew and specialized implementations. As process control communications evolve decentralization, flexibility and power of these process control networks will improve. Examples of recent standards for process control system communication include FOUNDATION™ fieldbus H1, FOUNDATION™ fieldbus HSE, Profibus PA®, Profibus DP®, Device-Net®, Hart®, CAN, and Modbus protocols. These protocols implement communication standards and functions but vary in capabilities and requirements.

Maintenance of a process control network involves many aspects and is evolving. This situation presents challenges to the network administrators as capabilities evolve and control remains elusive. The majority of process control networks control and monitor machines that carry on processes and sensors for accessing performance of these machines in real or near real time. In past network operations a problem would be discovered when a catastrophic problem such as a system crash occurred. Following such a problem a technician would be dispatched to the symptom and begin trouble shooting. With the primitive data available to the technician an experienced guess guided where to look and what analysis devices to bring to the site of the problem. When the production site was remote from the technician site additional time would be lost. These situations (sketchy data and travel to site) exacerbated time to repair the actual problem. Monitoring of these networks requires more then sequencing and finding problems. As anytime a problem occurs the process and typically the machine will have to be shut down causing production stoppage and lost revenue. With today's tight budgets and fill schedules of machines system problems need to be anticipated and solved before they happen.

Devices and capabilities have started to be promulgated for monitoring and identifying nodes (typically machines and sensors) problems. However, these devices are aimed at characterizing problems after they occur. Or exhaustive statistical processes that consume time, processor power, and storage space to arrive at a solution that usually can often be resolved with simple conditional data awareness. While the data these devices generate are useful they will only reduce the down time of catastrophic failures, not prevent their occurrence.

What is missing from the offerings of present process control system network monitors is a device that will provide flexibility in process control network communications standards, facilitate flexibility in network monitoring (including Ethernet interface), and perform network performance statistics analysis in real or near time.

SUMMARY OF THE INVENTION

A diagnostic access device that connects to an industrial process control network for the purpose of monitoring and diagnosing the network and reporting these diagnoses in a status report on an Ethernet, a mobile device or on a display. The process control network communications supported by this diagnostic access device include; FOUNDATION™ fieldbus H1, FOUNDATION™ fieldbus HSE, Profibus PA®, Profibus DP®, Device-Net®, Hart®, CAN, and Modbus protocols. Through dedicated processing and combining of diagnostic data (protocol, process and environmental) the diagnostic access device provides a more thorough analysis of potential problems than previous methods of analysis. Utilizing these data emerging statistics will provide early warning to catch problems before they occur.

In accordance with one aspect of the present invention protocol errors and events which would not be caught by a traditional monitoring system are reported to the user. This capability is accomplished by tracking trending of parameters over time, specifically, when a network device starts to increase the number of times communication is lost during a period of time the user is alerted in the status report prior to an complete loss of function by a network device. The collection of the statistical parameters can assist engineers and technicians in diagnosing causes of events that previous systems did not offer. This approach is in contrast to the empirical diagnostic systems promulgated by others that are processor, memory, and time intensive; and therefore not as responsive as the present invention.

In accordance with another aspect of the present invention users may select reporting of events by a choice of interfaces. The diagnostic access device may be configured to alert the user with LEDs on the device front panel that can be programmed to change state based on criteria selected by the user. Additionally, an LCD panel or other visual technology display can be connected to the diagnostic access device. Further, diagnostic data can be accessed directly from the diagnostic access device via a network through eXtensible Markup Language. Further, diagnostic data can be accessed directly from the diagnostic access device via Hypertext Markup Language. Also, direct connection through USB connection is available. Additionally, other network protocols can be programmed into the diagnostic access device for specialty network access.

In accordance with the present invention operation of a typical diagnostic access system a trace or report will be to a user via a mechanism such as LED's or a display screen, or a computer via an electronic protocol such as OPC, XML, or HTML.

In accordance with another aspect of the present invention the diagnostic access system may be used with a device or a set of interconnected devices (network). The diagnostic access system has the flexibility to interface, monitor, and exercise devices directly or as a network. There are terms that define network configurations; a pre-commissioned network does not have a fully configured set of devices for operational control of a process. The diagnostic access system is useful for setting up the devices, testing their functionality, and confirming their interfacing. A commissioned network has had all of its devices configured for operational control of a process. The diagnostic access system is useful for this network for checking status, maintenance, adding or subtracting functionality, and reconfiguring.

In accordance with another aspect of the present invention users may cause the diagnostic access point to report possible intrusion detection on the network. The diagnostic access point detects intrusions or attempted intrusion by a means which is dependent on the type of process network being diagnosed. For some networks, a list of devices expected to be on the network can be entered into the diagnostic device, and any device which is detected transmitting on the process network can be compared to the list of authorized devices. Any device not on the list is a potential intruder.

In accordance with another aspect of the present invention users can analyze the statistics collected by the diagnostic access device to determine efficient use of the network and the devices. As an example, a specific network may have additional bandwidth available for use and thus can support more devices than are currently attached. This knowledge can save the user the cost of setting up a new network for devices that will function properly on the existing network.

In accordance with another aspect of the present invention the environmental data (conditional) is collected by the diagnostic access device along with the collected diagnostic data can be combined by the user to further analyze and illustrate causes of problems and errors. Users can by tracking these data combinations predict network device problems and solve them before they occur. Environmental data, including data such as bus voltage and ambient temperature, can be used to correlate problems seen on the network with other factors. For a simple example, perhaps a device begins to transmit incorrectly when the temperature rises above a certain point. By comparing the trend of temperature over time with the time that the device begins erroneous transmissions, a user can determine that high temperature may be the cause of the problem.

In accordance with another aspect of the present invention a diagnostic access device may be used as a point of consolidation for diagnostic data from other diagnostic access devices when multiple diagnostic access devices are employed on a network. Users configure a diagnostic access device as a point of consolidation to have the other diagnostic access points polled for summary status, simplifying the user's tasks.

In accordance with another aspect of the present invention a diagnostic access device may be configured to act as an independent interface to communicate on the fieldbus. Users desiring to communicate directly on the fieldbus can access the diagnostic access device connected to the fieldbus and exercise, program, and diagnose fieldbus devices directly. Users would do this by running software on a workstation which interfaces to the diagnostic device. This software would be designed to send messages through the diagnostic device onto the fieldbus in question, and receive messages from the fieldbus through the diagnostic device, making the diagnostic device a fieldbus gateway, and allowing for direct manipulation of the devices on the fieldbus.

In accordance with another aspect of the present invention a diagnostic access device may be accessed wirelessly from an Ethernet browser on a hand held computer or other mobile device when the diagnostic access device is connected to Ethernet with wireless capability. Users of this function will be able to communicate wirelessly with the diagnostic access device and review status and network health directly without needing to be at a console or the actual diagnostic access device. To enable this function, the diagnostic access device would be connected through its Ethernet port to a standard, off-the-shelf wireless access point. The handheld would communicate by sending wireless packets through the wireless access point to the diagnostic access device's Ethernet port, and responses from the diagnostic access device would be routed out its Ethernet port, through the wireless access point, and to the handheld device. Alternatively, a handheld or laptop can interface directly through a hardwire or USB connection or through use of a version of the present invention in the form of a PC Card. Although specific versions and implementations will be discussed in this disclosure they should not be though of as limiting the scope or intent of the diagnostic access system for monitoring, controlling, diagnosing, or predicting behavior of an industrial process control network.

DETAILED DESCRIPTION OF THE DRAWINGS

Figure 1:
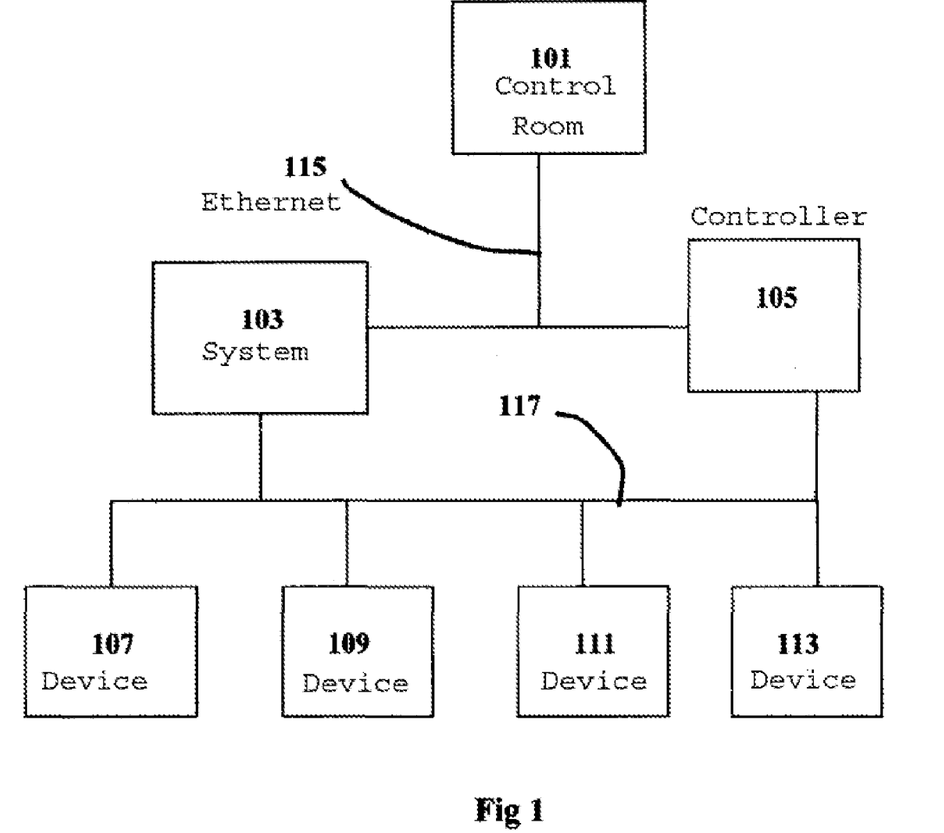
FIG. 1 shows the functional blocks of a diagnostic access device in a sample operational configuration.

FIG. 1 shows the functional blocks of a diagnostic access device in a sample operational configuration. A control room 101, or other suitable installation location is represented in this area. A diagnostic access system 103 device is represented in this area. An existing controller 105 is shown in this area. Room 101, and system 103 are connected by an Ethernet 115 (multiple Ethernet connections and interconnections are allowed) to controller 105. Configurations using system 103 may operate with or without a controller 105 depending on the system requirements. A collection of FOUNDATION™ fieldbus H1 Field Device 107, FOUNDATION™ fieldbus H1 Field Device 109, FOUNDATION™ fieldbus H1 Field Device 111, and FOUNDATION™ fieldbus H1 Field Device 113 are shown to reflect a typical multiple device connection process control configuration. Although single instantiations are shown; these devices 107, 109, 111, and 113 can also be connected in multiple as needed by the system configuration. As shown a device network of FOUNDATION™ fieldbus H1 fieldbus 117 connects system to Devices 107, 109, 111, 113 and controller 105. In this configuration system 103 resides both on the Ethernet 115 network and fieldbus 117 network. The controller 105 with the devices 107, 109, 111, and 113 may be a commissioned or pre-commissioned network depending on system status. The system 103 can directly or indirectly configure or reconfigure the devices to establish a commissioned network as shown. The system 103 will perform the function of diagnosing the Devices 107, 109, 111, 113 and the fieldbus 117 functions. The system 103 will report the diagnosis on the Ethernet 115 to the desired devices.

Figure 2:
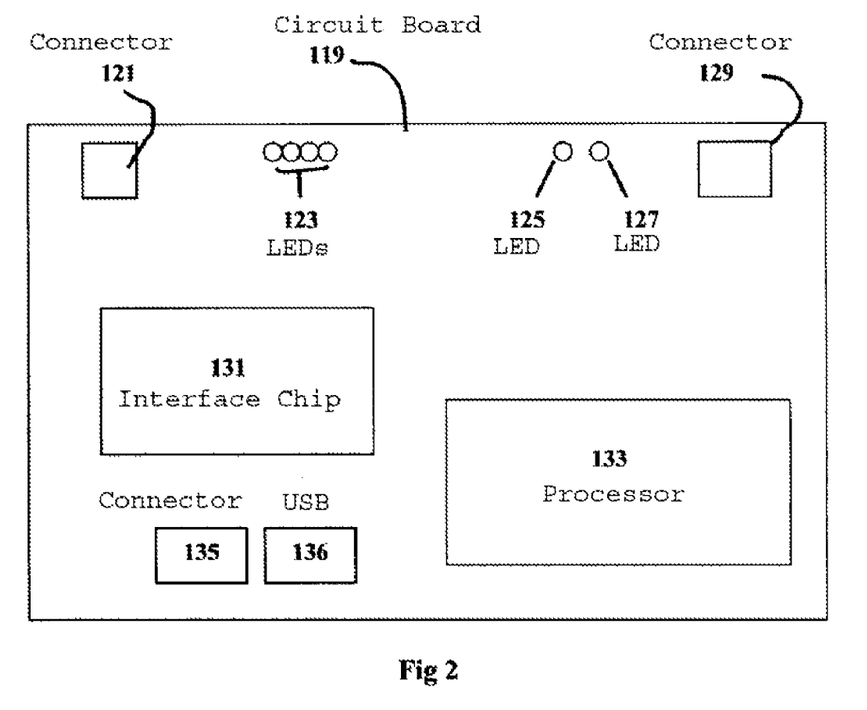
FIG. 2 shows a typical circuit board for a diagnostic access device.

FIG. 2 shows a typical circuit board for a diagnostic access device. A typical diagnostic access system circuit board 119 is shown configured for a FOUNDATION™ fieldbus process control network monitoring and Ethernet reporting. A FOUNDATION™ fieldbus connector 121 is provided for connecting to a FOUNDATION™ fieldbus process control cable. A set (4) of status LEDs 123 is shown, these LEDs can be configured for information display by users. A health LED 125 is provided to inform the user when the diagnostic access system is in good health (in this case a FOUNDATION™ fieldbus network). A power LED 127 is provided to inform the user when the diagnostic access system is powered properly. An interface circuit chip 131 is provided for interfacing to the process control network, in this case the Fieldbus chip for Fieldbus interfacing (shown as fieldbus 117 in FIG. 1). Typically this interface is determined and installed at the factory for the user to connect to the process control network. Returning to FIG. 2, a power connector 129 is provided for the user to plug in power (12 v or 24 v DC). A diagnostic access system processor 133 is shown. Processor 133 is typically a Freescale Semiconductor Coldfire processor with 16 MB ram, 4 MB Flash, USB, serial, and Ethernet communications capabilities. An Ethernet connector 135 is provided for plugging in a local Ethernet cable for reporting and monitoring. A USB connector 136 is provided for communicating with test devices such as handhelds or laptops. Other typical interface configurations of this diagnostic access device include but are not limited to Profibus PA®, Profibus DP®, Device-Net®, Hart®, CAN, and Modbus protocols. The board could be a standard circuit card or a PC Card (previously called a PCM-CIA Card) depending on the system requirements.

Figure 2A:
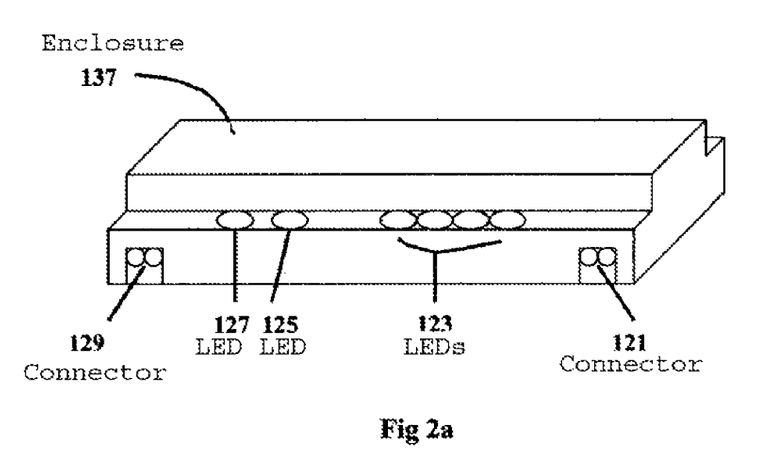
FIG. 2a shows a typical diagnostic access system enclosure.

FIG. 2a shows a typical diagnostic access system enclosure. A suitable enclosure 137 made of molded plastic or other appropriate material is shown. Visible from the present viewing angle is the connector 129. Indicators (LEDs) are viewable for user and include LED 127, LED 125 and LED 123 (set). Also visible is connector 121. The connectors 135 and 136 are not shown as they are on the back of enclosure 137. The compact footprint of the enclosure 137 allows placement of a diagnostic access device where it can be viewed by users for status monitoring while operating. When a PC Card form is chosen the operator will interface to the diagnostic access system through the host (where the PC Card is plugged into) display.

Figure 3:
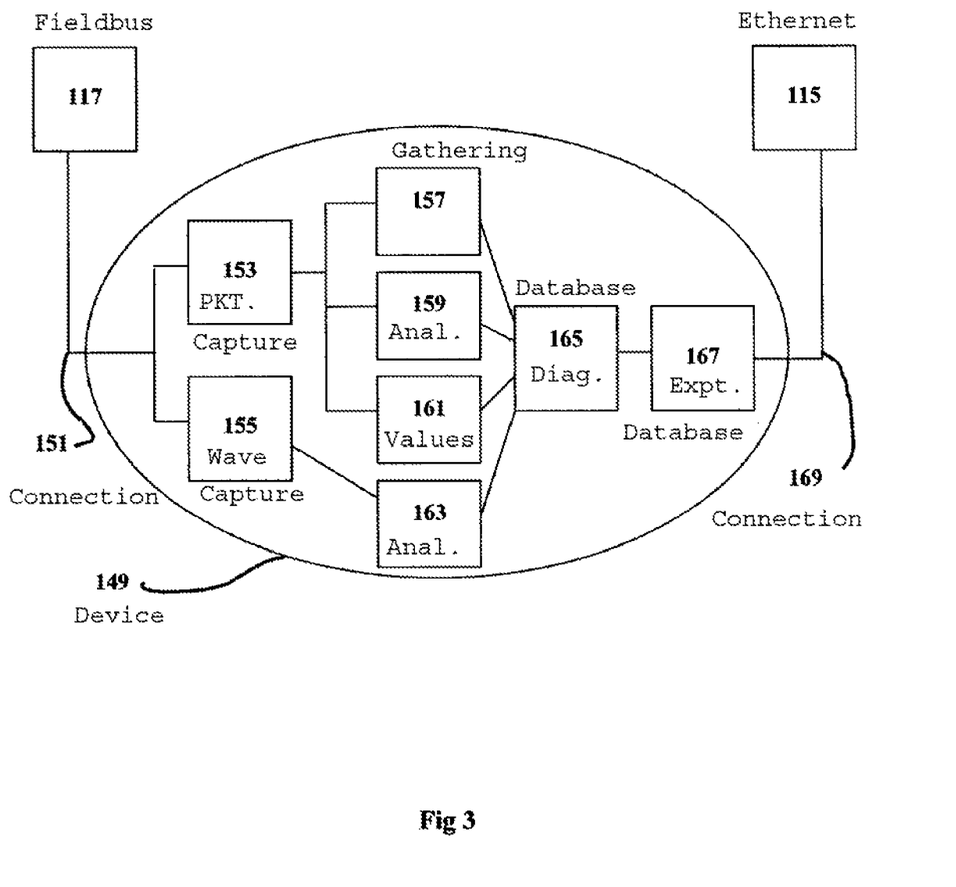
FIG. 3 shows a functional flow block diagram for a diagnostic access device.

FIG. 3 shows a functional flow block diagram for a diagnostic access device. The oval defines the functions contained in a diagnostic access device function 149. In the discussion that follows the reader will see that the diagnostic access system functions allow operators the flexibility to interface to a variety of industrial process control networks for analysis, control and monitoring with a choice of access interfaces ranging from Ethernet to USB. The flexibility provided by the diagnostic access system allows the operators a convenient choice of devices (such as terminals, handhelds, or laptops) for interaction with the net to be monitored, modified, or analyzed. An outside connection 151 is shown connecting function 149 to chip 131 (connected to fieldbus 117 as discussed in FIG. 2). Returning to FIG. 3, an additional outside connection 169 is shown connecting function 149 to Ethernet over connector 135 or USB 136. The connection 169 could be hardwire or wireless. A function at the input of chip 131 (shown in FIG. 2) is Digital Packet Capture 153, performing the initial step in data analysis. Capture 153 is specific to the fieldbus being used, and will change for diagnostic access devices targeted at different fieldbus configurations. An additional function at the input of chip 131 (shown in FIG. 2) is Analog waveform Capture 155, performing the initial step in analog waveform analysis. Chip 131 (shown in FIG. 2) is specific to the fieldbus being used, and will change for diagnostic access devices targeted at different types of fieldbuses. The Capture 153 feeds a statistics gathering function 157 that performs quality checks, collects statistics and transfers these data to a diagnostic database 165. For example it can be determined if a published value on the bus should be considered an error if its' associated published status is bad. Capture 153 also feeds a protocol quality analysis 159 function that examines for protocol and searches for errors and discrepancies and transfers these data to database 165. For example if packet into the chip 131 (shown in FIG. 2) is malformed and cannot be decoded by the Manchester decoding built into the chip 131 (shown in FIG. 2) it is considered bad and alerts are shown on the front panel (FIG. 2a), returning to FIG. 3, cataloged in the data base, and sent to the devices desired by the operator. Capture 153 additionally feeds a process values 161 function that determines actual process values and status and transfers these data to database 165. Capture 155 feeds a signal analysis 163 function that compares actual analog signals to expected waveform qualities and levels and transfers these results to database 167.

Figure 4:
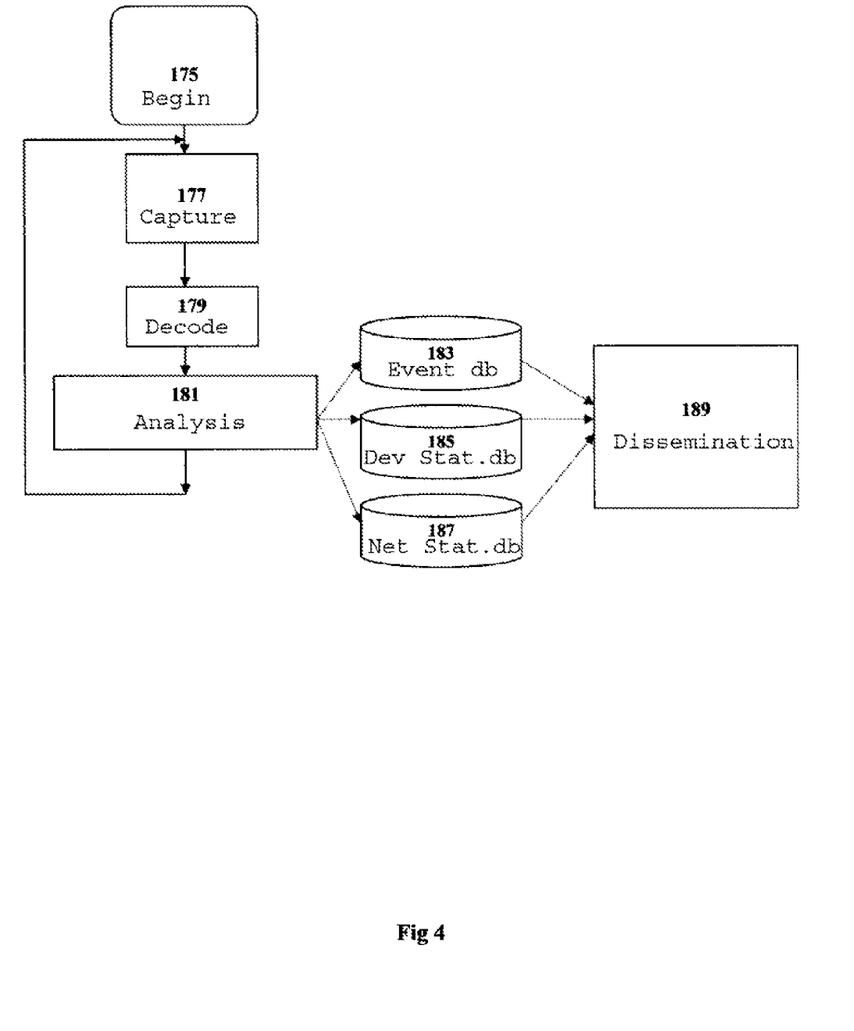
FIG. 4 shows a software flow for a diagnostic access device.

FIG. 4 shows a software flow for a diagnostic access device. A begin block 175 is provided to start the explanation of software flow in a diagnostic access system. Block 175 connects to a capture block 177 where a data packet is captured from chip 131 (shown in FIG. 2). Returning to FIG. 4 following packet capture a block 179 will perform the decode function on the captured data packet. Following decode by block 179 a heuristic analysis is performed in block 181. Block 181 feeds 3 databases for data storage. A first data line feeds an event log database 183 for compiling event data. These data are then transferred from database 183 to a block 189 where network requests are processed with reporting and data communication sharing facility for XML, HTML, and other protocols. A second data line from block 181 feeds a device statistics database 185. These data are then transferred from database 185 to block 189 for dissemination. A third data line form block 181 feeds a network statistics database 187. When database 187 collects appropriate status these data are transferred to block 189 for dissemination.

Figure 5:
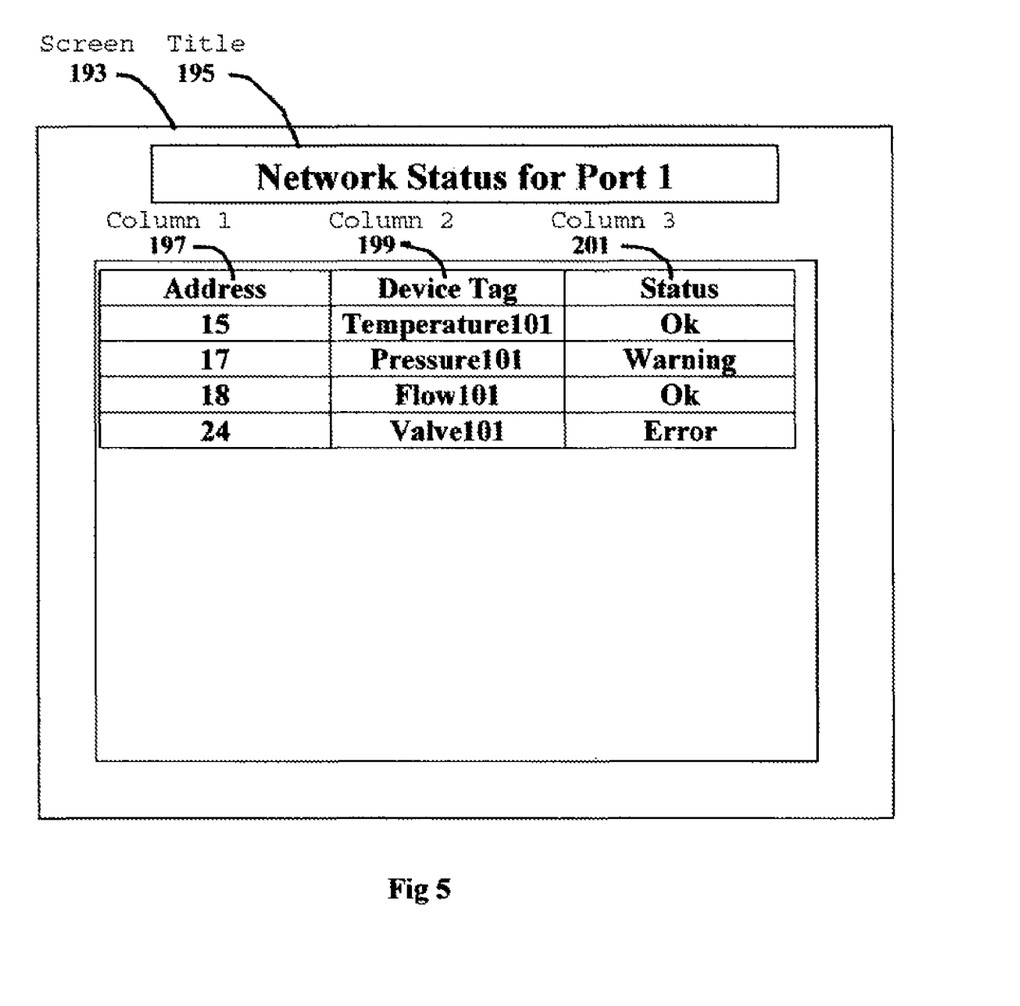
FIG. 5 shows a typical user interface for a diagnostic access device.

FIG. 5 shows a typical user interface for a diagnostic access device. A user has a choice of interfaces that include a laptop, handheld, or by utilizing the net function from any Ethernet-connected computer. The user interface shown in FIG. 5 is a typical interface screen 193 with a title block 195 displaying the subject of the message "Network Status for Port 1". The user will know what status is being displayed and which physical port on the diagnostic access device is being referred to by the message in block 195. The screen 193 features 3 columns for display of specifics of presented status. A first column 197 displays "Address" of the specific device. A second column 199 displays "Device Tag" to aide the user in meaningfully identifying the device. A third column 201 displays "Status" to detail the specific device status. A series of sample entries in subsequent lines in columns 197 through 201 are presented to give the reader further information.

Figure 6:
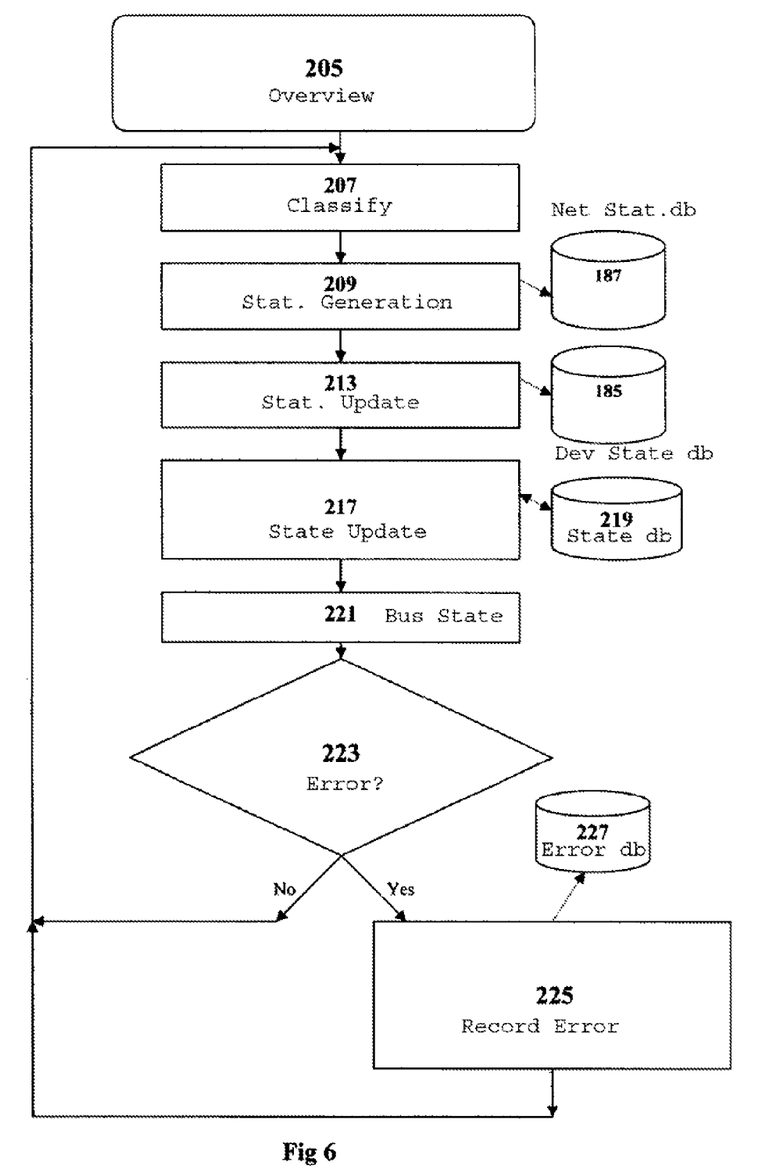
FIG. 6 shows a statistical process/procedure for a diagnostic access device.

FIG. 6 shows a statistical process/procedure for a diagnostic access device. An analysis overview block 205 is shown for data analysis (note: contents of Statistics database and Error Log database are specific to the fieldbus 117 being analyzed (as shown in FIG. 1), and thus will change for diagnostic access devices targeted at different fieldbuses). Returning to FIG. 6, initially a decoded packet from block 205 is classified in block 207. Next network statistics for this packet type are generated in block 209. A storage function connects block 209 to database 187 for archiving and reporting. Next an update on the statistics for the device that sent the packet is performed in block 213. A storage function connects block 213 to database 185 for archiving, sharing, and reporting. Next a function of determining the new state of the bus based on previous state, and the new packet is performed in block 217. A bi-directional connection to a bus state storage database 219 interoperates with block 217 to both provide the previous state of the bus, and to store the new bus state which is calculated based on the received packet. Database 219 which holds the bus state is specific to a particular fieldbus, and its contents will change for diagnostic access devices targeted at different fieldbuses. Following block 217 a block 221 will assess the state of the bus following the above processes. Next a functional decision 223 determines if the new state of the bus indicates an error. If the answer is Yes a functional block 225 will record an error in three places; referring to FIG. 3 first repository is database 183 for event log, second is database 185 for device statistics, and third is database 187 for network statistics. Returning to FIG. 6 block 225 will transfer summary error data to an error log database 227 to be available for reporting and analysis. As described in the above text the present invention focuses monitoring of a network on the network's condition, configuration, and operating status facilitating timely "network health" information availability without the characteristics of previous attempts towards monitoring and diagnosing process control networks and devices which require extensive storage and processing.

Figure 7:
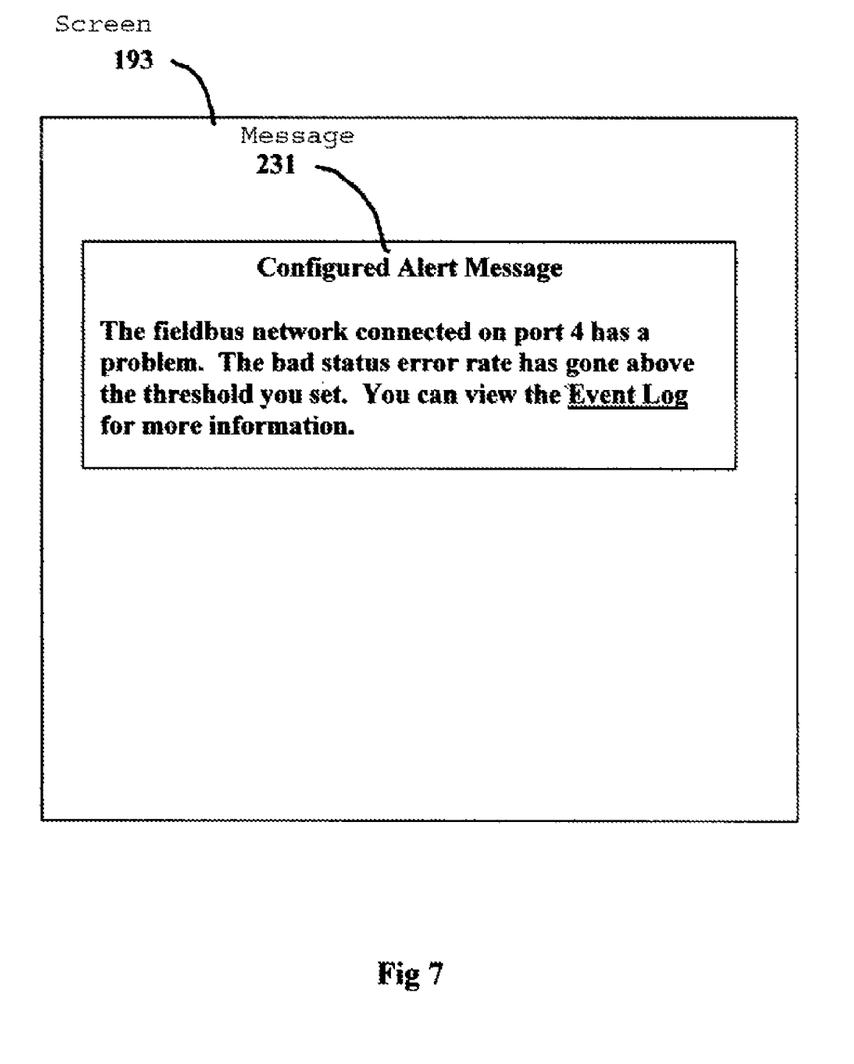
FIG. 7 shows a sample alert from a diagnostic access device.

FIG. 7 shows a sample alert from a diagnostic access device. This screen can be displayed on a choice of interfaces depending on the operator's requirements and situation. An additional screen 193 shows an alert display 231 dialog. The message contained in display 231 will give the user details of network status concerns.

Figure 8:
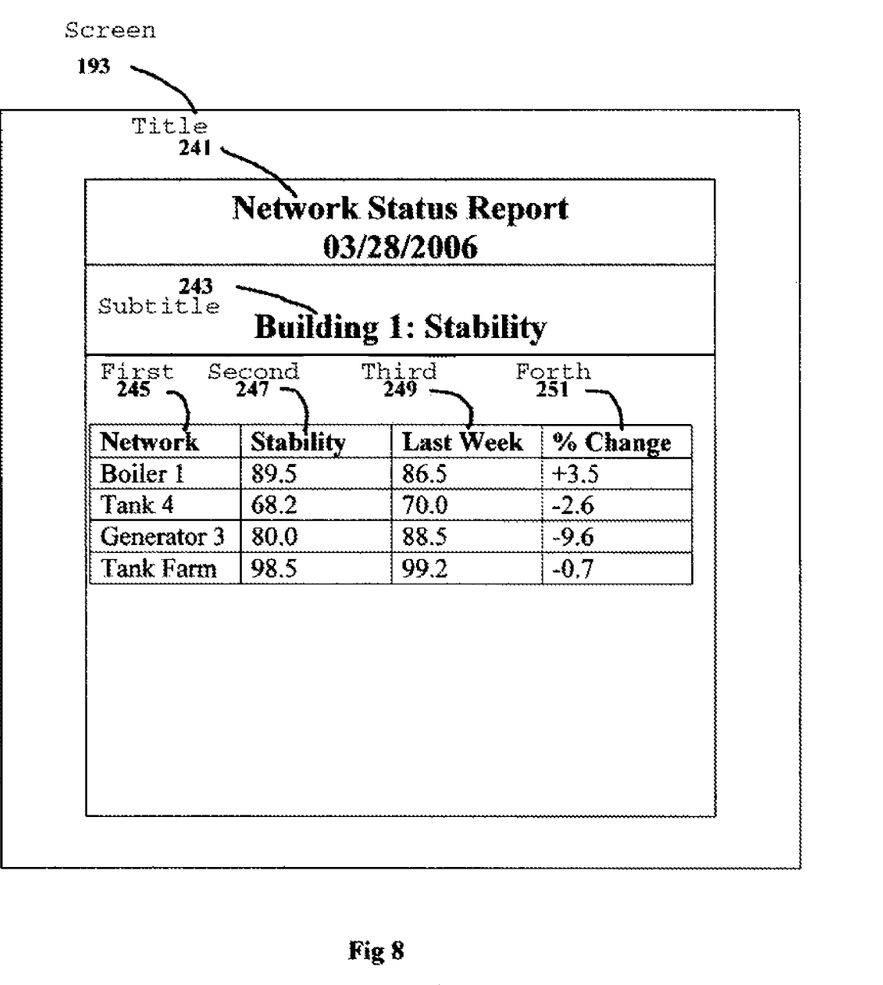
FIG. 8 shows a sample report for a diagnostic access device.

FIG. 8 shows a sample report for a diagnostic access device. An additional sample screen 193 is provided to view a report. A title block 241 displays "Network Status Report" with date to inform the user of the type and date of the report. A subtitle block 243 informs the user of where the status report device is physically located and the type of report. In this case the location is "Building 1" and the report concerns "Stability". Four columns are provided in this sample report. A first column 245 has the title of "Network" and will inform the user which network is being reported. A second column 247 has the title "Stability", a value will be displayed for the respective network to represent a network-specific measure of the stability of network operations. A third column 249 has the title "Last Week", the stability value as of last week will be displayed. A forth column 251 has the title "% Change", the difference between column 247 and 249 is displayed here for the user to have an immediate comparison of the specific network's stability.

Figure 9:
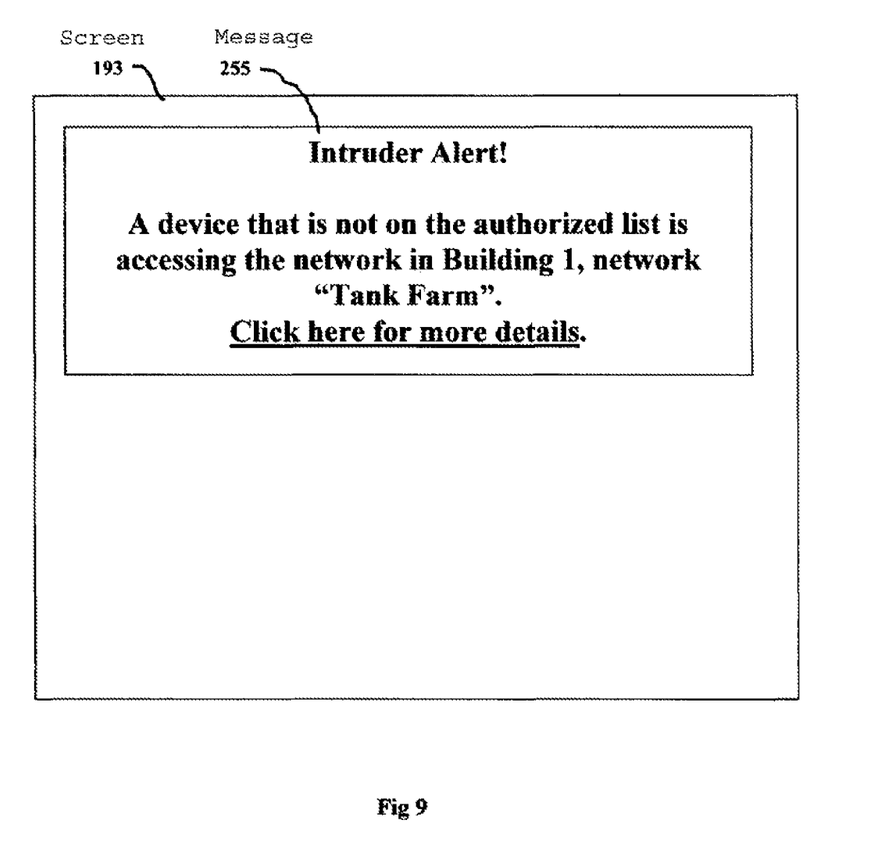
FIG. 9 shows a sample intrusion alert from a diagnostic access device.

FIG. 9 shows a sample intrusion alert from a diagnostic access device. An additional sample screen 193 is shown with an alert block 255. The message in block 255 is titled "Intruder Alert!". Specific information is also shown that will inform the user specifics of which network, location, and a clickable path for more details.

Operation

In the preferred mode of operation, the diagnostic access device is situated between an Ethernet network, which may connect to operator stations or a control room, and one or more fieldbus networks to be analyzed and diagnosed for proper operation. The function of the diagnostic access device is to diagnose the operation of devices on the fieldbus networks, and to communicate the diagnostic information so gathered to operator stations or computers in the control rooms.

Procedures for a typical installation of a diagnostic access device follow.

1. Referring to FIG. 2 the diagnostic access device is connected at the 129 connector to a 12 or 24V power supply,
2. Next a system Ethernet cable is connected to the diagnostic access device at the Ethernet connector 135 or USB connector 136,
3. Connection of the process control network is accomplished by inserting the connector of the fieldbus network cable into the diagnostic access device connector 121 connector,
4. Power is automatically enabled whenever there is 12V or 24V on the connected lines. When power is applied the "power" and "health" LEDs (127 and 125) on the diagnostic access system LED 127 will light, showing that the system is powered and functioning.
5. When multiple fieldbus networks are connected to a diagnostic access device an associated "status" 123 LED for each fieldbus network will flash, showing that the diagnostic access device is receiving traffic on that particular fieldbus network.
6. When these steps are successfully completed the diagnostic access device is operational and actively analyzing the connected networks who's associated LEDs are lit.
7. Once the operational status of the diagnostic access device is confirmed by examining the LEDs, the user can launch a diagnostic program on a separate PC, perhaps in a control room. This program connects to the diagnostic access device over the Ethernet, queries the diagnostic access device regarding the diagnostic status of each of the connected fieldbuses, and reports the results graphically to the user.

DESCRIPTION OF THE PREFERRED EMBODIMENT(S)

A preferred embodiment of the present invention can be viewed in FIG. 2. A Coldfire processor with a Fieldbus interface and Ethernet will be a typical processor and satisfy many process control requirements. However, the flexibility of the diagnostic access system allows it to be adapted by processor, interface, and adapters to most any process control network. Additionally, the flexibility of monitoring and reporting with LEDs, LCDs, Ethernet, and wireless capability (through Ethernet and a browser) will satisfy most control system needs.

What is claimed is:

1. A dedicated independent diagnostic access device for effecting network health performing quality checks of a process control system network communication diagnostic data through combining diagnostic data packet analysis, including protocol, process, and environmental data, network communication diagnostics analyzing data packets' emerging statistics to provide "early warnings" to facilitate adding or subtracting network communication functionality and reconfiguring of intelligent network field devices commonly coupled to a network, comprising:

a data network connection for receiving and transmitting network communication diagnostic data from network packet analysis, a process control network connection for receiving and transmitting process control network diagnostic data packets, a power connection, a processor,
a network packet analysis operational software program,
a network packet analysis user software program,
a network packet analysis user interface; and
the processor operating on the process control network diagnostic data packets with the operational software, characterizing data diagnostics and quality, communicating network packet diagnostic data to operators through the user interface and/or through the data network.

2. The device of claim 1, wherein a commissioned network is permanently connected for a commissioned network monitoring of diagnostic packet data.

3. The device of claim 1, wherein a remote commissioned network is temporarily connected for remote network monitoring of diagnostic packet data.

4. The device of claim 1, wherein a remote commissioned network is permanently connected for remote network monitoring of diagnostic packet data.

5. The device of claim 1, wherein multiple diagnostic access devices may be installed in a single commissioned network of diagnostic packet data.

6. The device of claim 1, wherein a single device may be designated as a single point of consolidation for all the diagnostic packet data monitoring of a commissioned network.

7. The device of claim 1, wherein the user interface is selected from a choice of interfaces including a front panel, network terminal, handheld device, or laptop for monitoring of diagnostic packet data.

8. The device of claim 1, wherein the characterizing data diagnostics and quality measurements consist of heuristics data and statistical summaries of performance trend tracking containing at least diagnostic packet data.

9. A dedicated independent diagnostic access device for commissioned networks monitoring network health performing quality checks combining diagnostic packet data, including protocol, process, and environmental data, analyzing data emerging statistics to provide "early warnings" comprising:
    a data network connection for receiving and transmitting network packet data,
    a process control network connection for receiving and transmitting process control network packet data,
    a power connection,
    a processor,
    a network packet analysis operational software program,
    a network packet analysis a user software program,
    a network packet analysis user interface; and
    reporting for user interfacing.

10. The device of claim 9, wherein reporting of diagnostic packet data for user interfacing is through Light Emitting Diodes (LED)s on a front panel on the user interface.

11. The device of claim 9, wherein reporting of diagnostic packet data for user interfacing is through a hardwire connection to a handheld device.

12. The device of claim 9, wherein reporting for user interfacing to diagnostic packet data is through a Graphical User Interface (GUI) on a networked computer.

13. A program product comprising a statutory medium operating on a dedicated independent diagnostic access device performing heuristic and statistical analysis where data sharing communication of environmental and diagnostic packet data is provided for Object linking and embedding for Process Control (OPC), Extensible Markup Language (XML), and Hyper Text Markup Language (HTML).

14. The program product comprising a statutory medium operating on a dedicated independent diagnostic access device of claim 13, wherein data sharing communication of diagnostic packet data provided is for other network protocols through program module and device addition.

15. The program product comprising a statutory medium operating on a dedicated independent diagnostic access device of claim 13, wherein early warning diagnostics of diagnostic packet data are provided through heuristic and statistical processes.

16. The program product comprising a statutory medium operating on a dedicated independent diagnostic access device of claim 13, wherein reports of protocol errors, statistical trends, and events of diagnostic packet data are reported and traceable as a typical diagnostic access system information.

17. The program product comprising a statutory medium operating on a dedicated independent diagnostic access device of claim 13, wherein intrusions or attempts of intrusions are reported as a typical diagnostic packet data access system information.

18. The program product comprising a statutory medium operating on a dedicated independent diagnostic access device of claim 13, wherein statistical and environmental data records of published network performance are gathered as typical diagnostic packet data access system information.

19. The program product comprising a statutory medium operating on a dedicated independent diagnostic access device of claim 13, wherein statistical and environmental data are combined and reported as typical diagnostic packet data access system information.

20. A method of configuring a dedicated independent diagnostic access device for effecting health and reliability diagnostics of a process control system through combining communication diagnostic data (protocol, process, and environmental) analyzing network packet data emerging stats to provide "early warnings" to facilitate adding or subtracting functionality and reconfiguring of intelligent field devices to a fieldbus network for monitoring consisting of:
    interfacing to a network packet analysis data network,
    interfacing to a network packet analysis process control network,
    powering from a source,
    monitoring environmental conditions,
    processing,
    operating from a network packet analysis operational software program,
    processing control operating on the process control network with the operational software characterizing data quality and communicating network packet analysis through the user software; and
    interfacing with an additional network that is an Ethernet connection.

21. The method of claim 20, wherein an additional network interface for network packet analysis connection is a wireless Ethernet.

22. The method of claim 20, wherein an additional network interface for network packet analysis connection consists of a multiple connection of Ethernets.

23. The method of claim 20, wherein the process control network interface for network packet analysis connection consists of industry network standards utilizing twisted pair or fiber media to communicate between multiple nodes.

24. The method of claim 20, wherein the process control network interface for network packet analysis connection consists of multiple connections of industry network standards utilizing twisted pair or fiber media to communicate between multiple nodes.

* * * * *